(12) United States Patent
Jeromin et al.

(10) Patent No.: US 11,878,408 B2
(45) Date of Patent: Jan. 23, 2024

(54) SYSTEMS AND METHODS FOR MULTI-SECTIONAL SHOW ROBOT

(71) Applicant: Universal City Studios LLC, Universal City, CA (US)

(72) Inventors: Aaron Chandler Jeromin, Winter Garden, FL (US); Akiva Meir Krauthamer, Orlando, FL (US); Timothy Fitzgerald Garnier, Orlando, FL (US); Elam Kevin Hertzler, Winter Garden, FL (US); Matthew Sean Pearse, Orlando, FL (US); Samuel James Knox, Orlando, FL (US); Lee Marvin Wilson, Kissimmee, FL (US); Kimberly Anne Humphreys, Orlando, FL (US); Cody Daniel Nichoson, Orlando, FL (US); Trace Andrew Dressen, Katy, TX (US)

(73) Assignee: Universal City Studios LLC, Universal City, CA (US)

(*) Notice: Subject to any disclaimer, the term of this patent is extended or adjusted under 35 U.S.C. 154(b) by 131 days.

(21) Appl. No.: 17/225,793

(22) Filed: Apr. 8, 2021

(65) Prior Publication Data
US 2021/0354304 A1 Nov. 18, 2021

Related U.S. Application Data

(60) Provisional application No. 63/024,640, filed on May 14, 2020.

(51) Int. Cl.
*B25J 11/00* (2006.01)
*B25J 9/16* (2006.01)
*B25J 13/08* (2006.01)

(52) U.S. Cl.
CPC ........... *B25J 11/003* (2013.01); *B25J 9/1664* (2013.01); *B25J 9/1674* (2013.01); *B25J 9/1697* (2013.01); *B25J 11/0005* (2013.01); *B25J 13/089* (2013.01)

(58) Field of Classification Search
CPC ...... B25J 11/003; B25J 9/1664; B25J 9/1674; B25J 9/1697; B25J 11/0005; B25J 13/089;
(Continued)

(56) References Cited

U.S. PATENT DOCUMENTS 6,831,436 B2 12/2004 Gonzalez
8,560,123 B2 10/2013 Choi
(Continued)

FOREIGN PATENT DOCUMENTS

EP 1644782 B1 3/2009

OTHER PUBLICATIONS

T. Miki, P. Khrapchenkov and K. Hori, "UAV/UGV Autonomous Cooperation: UAV assists UGV to climb a cliff by attaching a tether," 2019 International Conference on Robotics and Automation (ICRA), Montreal, QC, Canada, 2019, pp. 8041-8047, doi: 10.1109/ICRA.2019.8794265.*

(Continued)

*Primary Examiner* — Jeff A Burke
*Assistant Examiner* — Blake A Wood
(74) *Attorney, Agent, or Firm* — Fletcher Yoder, P.C.

(57) ABSTRACT

A robotic system includes a multi-sectional show robot. The multi-sectional show robot includes a primary robot with a controller and one or more sensors. The one or more sensors are configured to acquire feedback indicative of an environment surrounding the primary robot. The multi-sectional show robot also includes a secondary robot configured to removably couple to the primary robot to transition the multi-sectional show robot between a disengaged configuration, in which the primary robot is decoupled from the secondary robot, and an engaged configuration, in which the primary robot is coupled to the secondary robot. The controller is configured to operate the primary robot based on the feedback and a first control scheme with the multi-sectional show robot in the disengaged configuration and to operate the primary robot based on a second control scheme with the multi-sectional show robot in the engaged configuration.

24 Claims, 7 Drawing Sheets

(58) Field of Classification Search
CPC ...... B25J 9/1689; B25J 9/0084; B25J 9/1694; B25J 19/02; G05B 2219/40411; G05B 2219/40417; A63G 31/00
See application file for complete search history.

(56) References Cited

U.S. PATENT DOCUMENTS

| | | | |
|---|---|---|---|
| 9,616,350 | B2 | 4/2017 | Stenzler et al. |
| 9,840,008 | B2 | 12/2017 | Komatsu et al. |
| 10,207,193 | B2 | 2/2019 | Stenzler et al. |
| 10,406,448 | B2 | 9/2019 | Vyas |
| 11,032,166 | B2 | 6/2021 | Nocon et al. |
| 2011/0137458 | A1* | 6/2011 | Hisatani ............ B08B 3/024 901/1 |
| 2017/0057080 | A1* | 3/2017 | Krohne ............ B25J 11/005 |
| 2018/0071643 | A1 | 3/2018 | Cortelyou et al. |
| 2018/0311822 | A1* | 11/2018 | Kaminka ............ G05D 1/0094 |
| 2019/0099886 | A1* | 4/2019 | Chattopadhyay .... G05B 23/024 |
| 2019/0302991 | A1 | 10/2019 | Vyas et al. |
| 2019/0351340 | A1 | 11/2019 | Goergen et al. |

OTHER PUBLICATIONS

Modular Robotics, Cubelets—Robot Blocks, 2012, 15 pages, https://www.modrobotics.com.

Parasitic Robot System for Waypoint Navigation of Turtle, phys.org, May 22, 2017, 4 pgs, The Korea Advanced Institute of Science and Technology (KAIST), https://phys.org/news/2017-05-parasitic-robot-waypoint-turtle.html.

PCT/US2021/031054 International Search Report and Written Opinion dated Sep. 3, 2021.

* cited by examiner

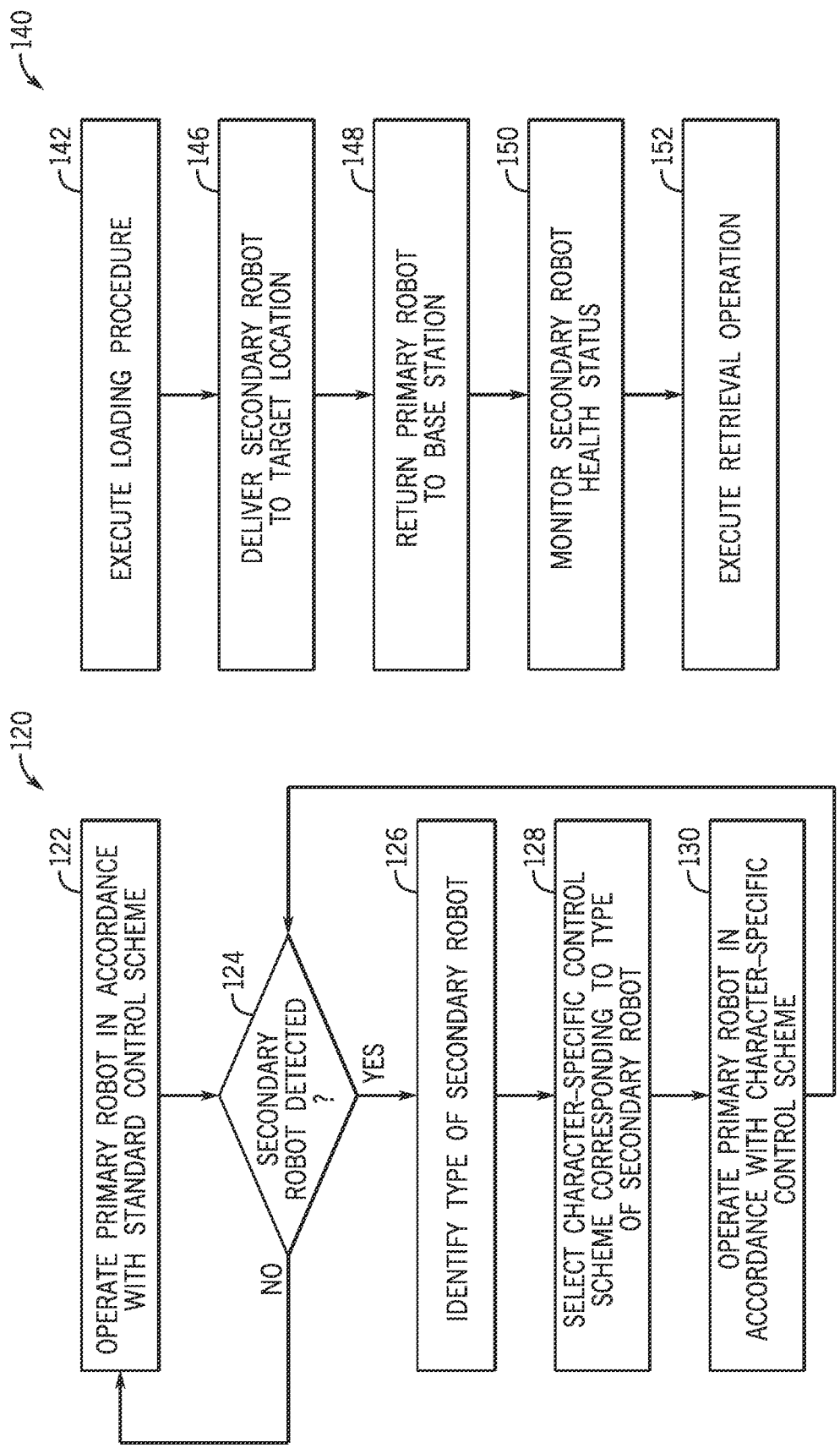

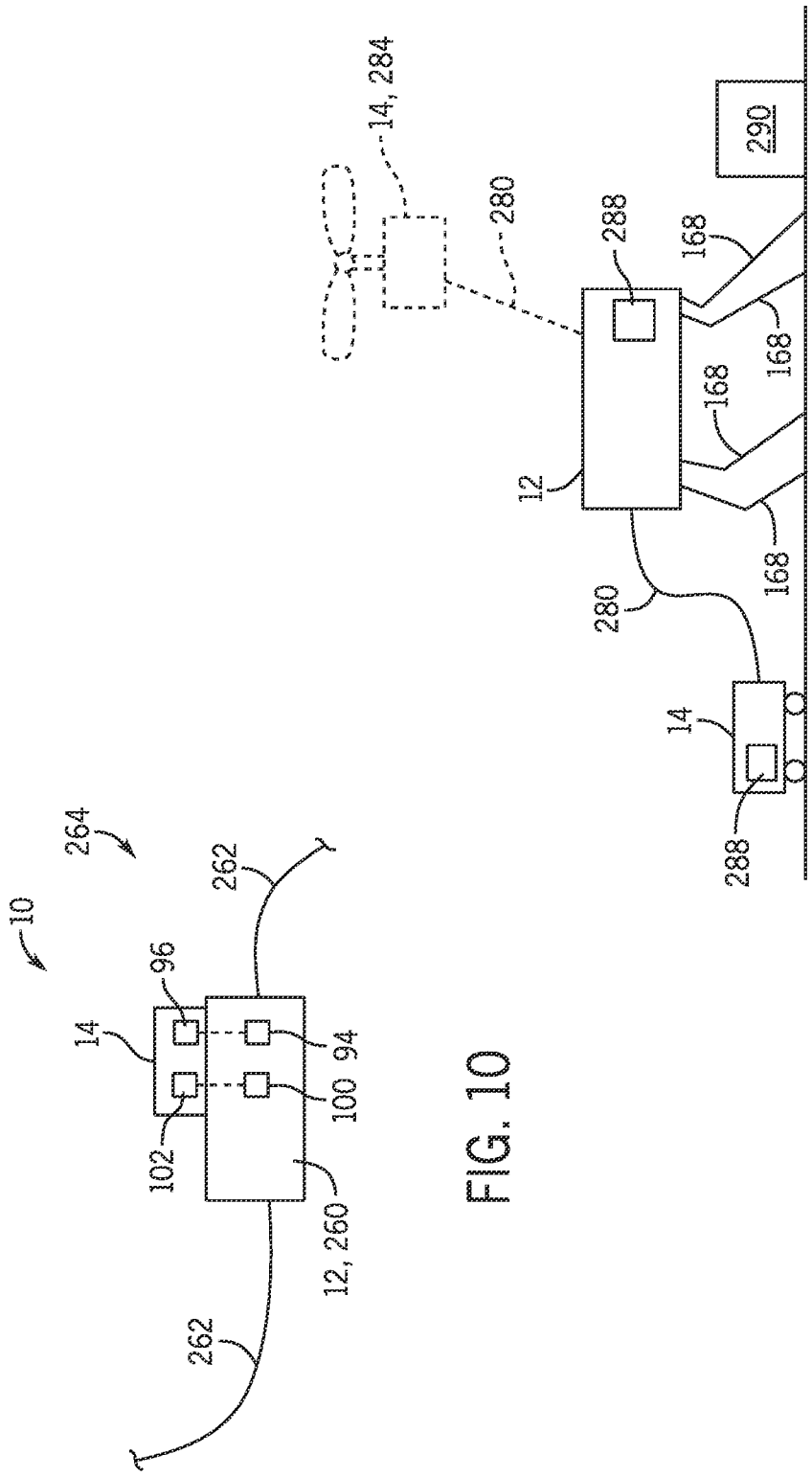

SYSTEMS AND METHODS FOR MULTI-SECTIONAL SHOW ROBOT

CROSS-REFERENCE TO RELATED APPLICATIONS

This application claims priority from and the benefit of U.S. Provisional Application Ser. No. 63/024,640, entitled "SYSTEMS AND METHODS FOR MULTI-SECTIONAL SHOW ROBOT," filed May 14, 2020, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An amusement park may include a show robot (e.g., an animatronic figure) that interacts with or otherwise entertains park guests of the amusement park. For example, the show robot may be positioned along a ride path of an attraction of the amusement park or at a particular location in the amusement park to contribute to an overall theme of the attraction or location. The show robot may move through preprogrammed positions or acts when guests are directed past (e.g., via a ride vehicle of the attraction) or walk past the show robot. As such, the show robot may enhance a guest's immersive experience provided by the attraction or themed amusement park location having the show robot. Unfortunately, because a position of the show robot may be unchanged over time, a demand for interacting with and revisiting the show robot may gradually reduce. Moreover, it may be expensive and time consuming to develop, manufacture, and maintain a plurality of individual show robots designed for interacting with the park guests at various locations along the amusement park.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a robotic system includes a multi-sectional show robot. The multi-sectional show robot includes a primary robot having a controller and one or more sensors, where the one or more sensors are configured to acquire feedback indicative of an environment surrounding the primary robot. The multi-sectional show robot includes a secondary robot configured to removably couple to the primary robot to transition the multi-sectional show robot between a disengaged configuration, in which the primary robot is decoupled from the secondary robot, and an engaged configuration, in which the primary robot is coupled to the secondary robot. The controller is configured to operate the primary robot based on the feedback and a first control scheme with the multi-sectional show robot in the disengaged configuration and to operate the primary robot based on a second control scheme with the multi-sectional show robot in the engaged configuration.

In another embodiment, a method for operating a multi-sectional show robot includes generating feedback indicative of an environment surrounding a primary robot of the multi-sectional show robot via one or more sensors of the primary robot. The method includes determining, via a controller of the primary robot, that the multi-sectional show robot is in a disengaged configuration in which the primary robot is decoupled from a secondary robot of the multi-sectional show robot. The method also includes operating, via the controller, the primary robot based on the feedback and a first control scheme in response to determining that the multi-sectional show robot is in the disengaged configuration. The method further includes determining, via the controller of the primary robot, that the multi-sectional show robot is in an engaged configuration in which the primary robot is coupled to the secondary robot of the multi-sectional show robot. The method also includes operating, via the controller, the primary robot based on the feedback and a second control scheme in response to determining that the multi-sectional show robot is in the engaged configuration.

In another embodiment, a multi-sectional show robot includes a primary robot having one or more sensors configured to acquire feedback indicative of a first environment surrounding the primary robot. The multi-sectional show robot also includes secondary robot having one or more additional sensors configured to acquire additional feedback indicative of a second environment surrounding the secondary robot. The multi-sectional show robot further includes a computing system having a first controller of the primary robot, a second controller of the secondary robot, or both. The computing system is configured to receive an indication that the primary robot is coupled to the secondary robot and, in response to receiving the indication, operate the primary robot and the secondary robot based on a combined character control scheme and based on the feedback, the additional feedback, or both.

Various refinements of the features noted above may be undertaken in relation to various aspects of the present disclosure. Further features may also be incorporated in these various aspects as well. These refinements and additional features may exist individually or in any combination.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 2 is a flow diagram of an embodiment of a process for selecting a control scheme for operating the primary robot of the multi-sectional show robot, in accordance with embodiments of the present disclosure;

FIG. 3 is a flow diagram of an embodiment of a process for transporting the secondary robot across an environment via the primary robot of the multi-sectional show robot, in accordance with embodiments of the present disclosure;

FIG. 10 is a schematic of an embodiment of the multi-sectional show robot that includes a passenger ride vehicle, in accordance with embodiments of the present disclosure;

FIG. 11 is a schematic of an embodiment of the multi-sectional show robot that includes a tethering device extending between the primary robot and the secondary robot, in accordance with embodiments of the present disclosure.

DETAILED DESCRIPTION

Figure 1:
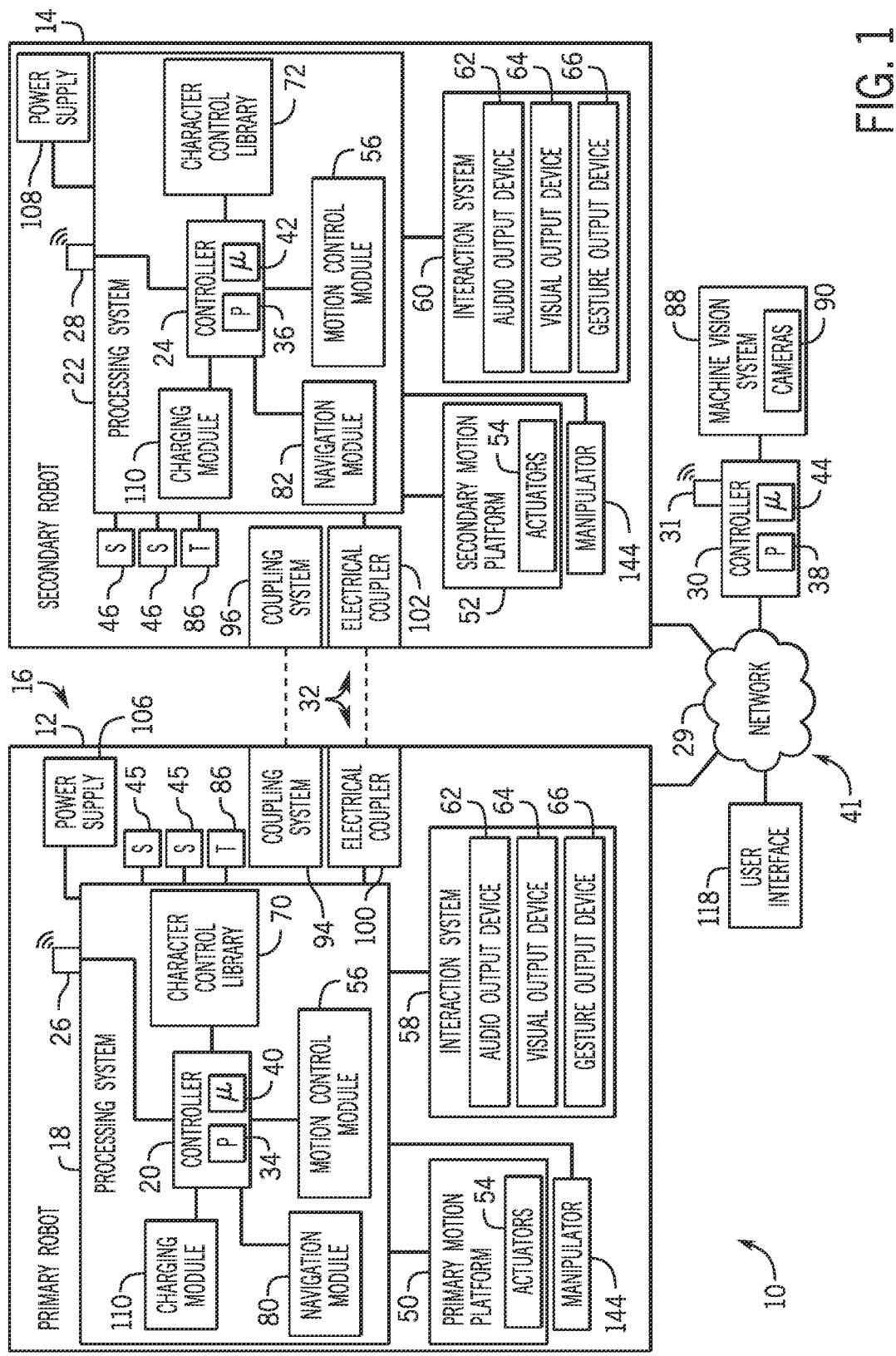
FIG. 1 is a schematic of an embodiment of a multi-sectional show robot having a primary robot and a secondary robot, in accordance with embodiments of the present disclosure.

One or more specific embodiments of the present disclosure will be described below. In an effort to provide a concise description of these embodiments, all features of an actual implementation may not be described in the specification. It should be appreciated that in the development of any such actual implementation, as in any-engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Present embodiments are directed to a multi-sectional show robot that may be configured to travel along an amusement park environment to interact with and/or provide a performance (e.g., show) to guests of the amusement park. The multi-sectional show robot may include a primary robotic section (e.g., a base robot), also referred to herein as a "primary robot," and a secondary robotic section (e.g., a parasitic robot), also referred to herein as a "secondary robot." The primary robot may include a primary motion platform that enables the multi-sectional show robot to traverse a terrain, such as various regions or areas of the amusement park along which guests may be located. For example, the primary motion platform may include a propulsion system having one of more wheels, tracks, legs, and/or other suitable mechanisms or devices that enable the primary motion platform to propel the multi-sectional show robot along a path. The secondary robot may include an animatronic system that forms at least a portion of a theme or character (e.g., dragon, wolf, or other creature) of the multi-sectional show robot. Particularly, the animatronic system may include one or more actuatable extremities or appendages (e.g., arms, head), themed covering structures (e.g., fur, scaling), audio output devices (e.g., acoustic speakers), and/or visual output devices (e.g., lighting features, displays) that may enhance a guest's perceived realism of the theme or character portrayed by the multi-sectional show robot. In some embodiments, the secondary robot includes an array of sensors enabling the secondary robot to detect guests in proximity to the multi-sectional show robot and to evaluate guests' interactions with and/or reactions to the multi-sectional show robot. Based on feedback acquired by the sensors, the secondary robot may initiate, adjust, terminate, or otherwise alter interaction of the multi-sectional show robot with one or more of the guests. In this manner, the primary robot may generally perform acts facilitating movement and/or repositioning of the multi-sectional show robot in the amusement park, while the secondary robot is tailored to enhance an immersive experience between park guests and the multi-sectional show robot.

As discussed in detail below, the secondary robot may be one of a plurality of secondary robots that are removably coupleable to the primary robot. Accordingly, various secondary robots having different theming or characters may be interchangeably equipped on the primary robot. In this manner, an overall theme or character of the multi-sectional show robot may be easily and quickly adjusted by replacing the type (e.g., particular theme or character) of secondary robot coupled to the primary robot. To this end, the multi-sectional show robot may utilize the same motion platform (e.g., the primary robot) to provide a plurality of uniquely themed robotic systems with which guest may interact, thereby reducing an overall manufacturing complexity and/or maintenance cost of the multi-sectional show robot (e.g., as compared to producing individual show robots for each theme or character). In some embodiments, the primary robot may be configured to determine the type (e.g., particular theme or character) of secondary robot coupled to the primary robot and may adjust its operation (e.g., a movement speed, a movement style) based on the detected type of secondary robot. Indeed, various programmed mannerisms (e.g., gestures, audible outputs, visual outputs) of the multi-sectional show robot may be automatically adjusted based on the type of secondary robot coupled to the primary robot.

In some embodiments, the secondary robot may be configured to selectively decouple from the primary robot at a first time period, such as when the primary robot arrives at a target location in the amusement park. The secondary robot may include a secondary motion platform (e.g., having one or more wheels, tracks, legs, and/or other suitable mechanisms or devices) that enable the secondary robot to traverse the amusement park environment along a first path that is independent of a second path of the primary robot. As such, the primary robot and the secondary robot may separately and independently interact with guests of the amusement park. For clarity, as used herein, the term "path" may refer to any one-dimensional (1D) (e.g., such as along a track), two-dimensional (2D) (e.g., such as along a defined or undefined planar route), three-dimensional (3D) (e.g., such as movement in the air, under water, or along a structure where depth or altitude is also traversable), or four-dimensional (4D) (such as where there are defined temporal aspects) route along which the primary robot and/or the secondary robot may travel. As discussed below, the path may be adaptive (e.g, controlled by the multi-sectional robot) and updated based on sensor feedback acquired by one or more sensors of the multi-sectional show robot, in some embodiments, the primary and secondary robots may be configured to interact differently with guests based on whether the robots are in an engaged configuration (e.g., physically coupled to one another to collectively form the multi-sectional show robot) or in a disengaged configuration (e.g., physically decoupled from one another).

In certain embodiments, the secondary robot may be configured to recouple to the primary robot (e.g., or to another primary robot traversing the amusement park environment) at a second time period, such as when a power level (e.g., a battery level) of the secondary robot falls below a threshold value. Upon re-coupling of the primary and secondary robots, the primary robot may initiate a charging procedure to charge a power supply (e.g., battery) of the secondary robot, may execute a transport procedure to return the secondary robot to a designated base station, or may perform another suitable action. Thus, in certain embodiments, the primary robot may be used to deliver the secondary robot to and to retrieve the secondary robot from various locations of the amusement park. As such, it should be understood that the multi-sectional show robot discussed herein may facilitate providing multitudinous unique robotic experiences to guests of an amusement park with fewer hardware components than traditional animatronic systems.

Keeping the above brief summary in mind, FIG. 1 is a schematic of an embodiment of a robotic system 10 having a primary robot 12 (e.g., a first robot) and a secondary robot 14 (e.g., a second robot) that, collectively, may form a multi-sectional show robot 16. The primary robot 12 includes a first processing system 18 having a first controller 20 and the secondary robot 14 includes a second processing system 22 having a second controller 24. The first controller 20 may be communicatively coupled to a first communication component 26 of the primary robot 12 and the second controller 24 may be communicatively coupled to a second communication component 28 of the secondary robot 14. In some embodiments, the first and second communication components 26, 28 enable communication (e.g., data transmission, signal transmission) between the first controller 20 and the second controller 24 via one or more wireless communication channels. In some embodiments, the first and second controllers 20, 24 may be communicatively coupled to one another via a network 29 and a system controller 30 of the robotic system 10. For example, the system controller 30 may include a communication component 31 enabling the system controller 30 to receive (e.g., via the network 29) communication signals from the first controller 20 and to transmit the communication signals (e.g., via the network 29) to the second controller 24, and vice versa. Further, as discussed below, the first and second controllers 20, 24 may be communicatively coupled via wired communication channels that may be included in respective electrical coupling systems 32 of the primary and secondary robots 12, 14.

The first controller 20, the second controller 24, and the system controller 30 each include respective processors 34, 36, 38 and memory devices 40, 42, 44. The processors 34, 36, 38 may include microprocessors, which may execute software for controlling component of the primary and secondary robots 12, 14, for analyzing sensor feedback acquired by respective sensors of the primary and secondary robots 12, 14, and/or for controlling any other suitable components of the robotic system 10. The processors 34, 36, 38 may include multiple microprocessors, one or more "general-purpose" microprocessors, one or more special-purpose microprocessors, and/or one or more application specific integrated circuits (ASICs), or sonic combination thereof. For example, the processors 34, 36, 38 may include one or more reduced instruction set computer (RISC) processors. The memory devices 40, 42, 44 may include volatile memory, such as random access memory (RAM), and/or nonvolatile memory, such as read-only memory (ROM). The memory devices 40, 42, 44 may store information, such as control software (e.g., control algorithms for controlling the primary and/or secondary robots 12, 14), look up tables, configuration data, communication protocols, etc.

For example, the memory devices 40, 42, 44 may store processor-executable instructions including firmware or software for the processors 34, 36, 38 execute, such as instructions for controlling any of the components of the primary and secondary robots 12, 14 discussed herein and/or for controlling other suitable components of the robotic system 10. In some embodiments, the memory devices 40, 42, 44 are tangible, non-transitory, machine-readable media that may store machine-readable instructions for the processors 34, 36, 38 to execute. The memory devices 40, 42, 44 may include ROM, flash memory, hard drives, any other suitable optical, magnetic, or solid-state storage media, or a combination thereof.

It should be understood that any of the processes and techniques disclosed herein may be fully or partially performed by the first processing system 18, the second processing system 22, and/or the system controller 30, which may collectively be referred to herein as a computing system 41. Thus, the computing system 41 may include the first processing system 18, the second processing system 22, the system controller 30, or any combination thereof. Accordingly, it should be appreciated that discussions herein relating to executing control processes or routines, storing data, forming control outputs, and/or performing other operations via the computing system 41 are intended to denote computational operations that may be performed partially or completely by the first processing system 18 of the primary robot 12, the second processing system 22 of the secondary robot 14, and/or the system controller 30.

The first controller 20 may be communicatively coupled to one or more first sensors 45 of the primary robot 12 and the second controller 24 may be communicatively coupled to one or more second sensors 46 of the secondary robot 14. The first and second sensors 45, 46 may acquire feedback (e.g., sensor data) of various operational parameters of the primary and secondary robots 12, 14 and/or of features (e.g., objects, amusement park guests) surrounding the primary and secondary robots 12, 14. The first and second sensors 45, 46 may provide (e.g., transmit) the acquired feedback to the first and second controllers 20, 24, respectively. As a non-limiting example, the first and second sensors 45, 46 may include proximity sensors, acoustic sensors, cameras, infrared sensors, and/or any other suitable sensors. As such, feedback acquired by the first and second sensors 45, 46 may facilitate operation of the multi-sectional show robot 16 in accordance with the techniques discussed herein. In some embodiments, feedback acquired by the first sensors 45 may enable control of both the primary robot 12 and the secondary robot 14, such that the second sensors 46 may be omitted from the secondary robot 14. Conversely, in other embodiments, feedback acquired by the second sensors 46 may enable control of both the primary and secondary robots 12, 14, such that the first sensors 45 may be omitted from the primary robot 12.

In the illustrated embodiment, the primary robot 12 includes a primary motion platform 50 (e.g., a first propulsion system) configured to propel the primary robot 12 along a path and the secondary robot 14 includes a secondary motion platform 52 (e.g., a second propulsion system) configured to propel the secondary robot 14 along the path or another suitable path. The primary and secondary motion platforms 50, 52 each include corresponding actuators 54 (e.g., electric motors, hydraulic motors, pneumatic motors) that enable the primary and secondary motion platforms 50, 52 to move the primary and secondary robots 12, 14 along the corresponding paths. As an example, the actuators 54 may be configured to drive one of more wheels, tracks, legs, propellers, and/or other suitable mechanisms or devices of the primary and secondary motion platforms 50, 52 that enable movement of the primary and secondary robots 12, 14. The primary and secondary motion platforms 50, 52 may be communicatively coupled to the first controller 20 and the second controller 24, respectively. To this end, the first and second controllers 20, 24 may send instructions to the primary and secondary motion platforms 50, 52 (e.g., to the corresponding actuators 54) to cause the primary and secondary motion platforms 50, 52 to move the primary and secondary robots 12, 14 along corresponding paths. In some embodiments, the first and second controllers 20, 24 may include respective motion control modules 56 that enable the first and second controllers 20, 24 to control the primary and secondary motion platforms 50, 52 in accordance with the operating specifications or control routines discussed herein.

In the illustrated embodiment, the primary robot 12 includes a first interaction system 58 (e.g., a first animatronic system) and the secondary robot 14 includes a second interaction system 60 (e.g., a second animatronic system). The first and second interactions systems 58, 60 may each include one or more audio output devices 62 (e.g., speakers), one or more visual output devices 64 (e.g., lights, displays, projectors, etc.), and one or more gesture output devices 66 (e.g., movable appendages such as arms or a head, other actuatable mechanical features) that, as discussed in detail below, enable the multi-sectional show robot 16 to perform a show and/or interact with users (e,g., guests of an amusement park). The first interaction system 58 is communicatively coupled to the first controller 20 and the second interaction system 60 is communicatively coupled to the second controller 24. As such, the first and second controllers 20, 24 may instruct the first and second interaction systems 58, 60 to output audio, visual, or gesture outputs at designated time periods, such as when a guest is detected to be within a threshold distance of the primary robot 12 and/or the secondary robot 14. In some embodiments, the first interaction system 58 may be controlled based on feedback from the second sensors 46 and the second interaction system 60 may be controlled based on feedback from the first sensors 45. As an example, the computing system 41 may, based on feedback from the first sensors 45 indicating a collision between the primary robot 12 and an object, instruct the second interaction system 60 to output a particular audio output, visual output, and/or gesture output.

In some embodiments, the first processing system 18 includes a first character control library 70 and the second processing system 22 includes a second character control library 72. As discussed below, the first and second character control libraries 70, 72 may be stored on the respective memory devices 40, 42 and may include various control routines or algorithms that, when executed, enable the controllers 20, 24 to control the first and second interaction systems 58, 60 to emulate a particular character (e.g., dragon, wolf, or other creature) or theme. For example, the first and second character control libraries 70, 72 may specify types of audio recordings, visual displays, and/or gesture movements to be output by the respective audio output devices 62, visual output devices 64, or gesture output devices 66 of the primary and secondary robots 12, 14 when a guest is detected as being within a threshold range of the primary robot 12, the secondary robot 14, or both.

In certain embodiments, the first processing system 18 includes a first navigation module 80 and the second processing system 22 includes a second navigation module 82 that may be executed by the respective processor 34, 36. The first and second navigation modules 80, 82 may include control algorithms or other processor-executable routines that enable the first and second controllers 20, 24 to determine locations of the primary robot 12 and the secondary robot 14, respectively, and to facilitate movement of the primary and secondary robots 12, 14 along desired paths. For example, in certain embodiments, the navigation modules 80, 82 may facilitate processing of tracking signals received from respective tracking sensors 86 (e.g., global positioning system [GPS] sensors) of the primary and secondary robots 12, 14, which may be configured to monitor the respective locations of the primary and secondary robots 12, 14 in an environment (e.g., a designated roaming area of the amusement park). For clarity, as used herein, a "roaming area" may correspond to a region of space, such as a walkway or courtyard, along which the primary robot 12, the secondary robot 14, or both, may be configured to travel. A roaming area may include an envelope of travel defined by geo-fencing.

In some embodiments, robotic system 10 includes a machine vision system 88 that, as discussed in detail below, may facilitate tracking of the primary and/or secondary robots 12, 14 in addition to, or in lieu of, the tracking sensors 86. For example, the machine vision system 88 may include one or more cameras 90 or other image sensors configured to acquire image data (e.g., real-time video feeds) of the primary and secondary robots 12, 14 as the primary and secondary robots 12, 14 travel across an environment. The system controller 30 may be configured to analyze the image data acquired by the machine vision system 88 and, based on such analysis, extract respective locations of the primary and secondary robots 12, 14 relative to a reference point in the environment.

In the illustrated embodiment, the primary robot 12 includes a first coupling system 94 and the secondary robot 14 includes a second coupling system 96. The first and second coupling systems 94, 96 enable the primary and secondary robots 12, 14 to selectively couple (e.g, physically attach) or decouple (e.g., physically detach) from one another. As a non-limiting example, the first and second coupling systems 94, 96 may include permanent magnets, electromagnets, electrical, hydraulic, and/or pneumatic actuators, cables or tethers, robotic manipulators (e.g., grippers, end effectors) and/or any other suitable devices or systems that facilitate transitioning the multi-sectional show robot 16 between an assembled or engaged configuration, in which the primary and secondary robots 12, 14 are coupled (e.g., physically coupled, mechanically coupled) to one another, and a detached or disengaged configuration, in which the primary and secondary robots 12, 14 are decoupled (e.g., decoupled, mechanically detached) from one another.

In certain embodiments, the primary robot 12 includes a first electrical coupler 100 (e.g., a male plug or socket) and the secondary robot 14 includes a second electrical coupler 102 (e.g., a female plug or socket). These first and second electrical couplers 100, 102 form at least a portion of the electrical coupling systems 32. The first and second electrical couplers 100, 102 facilitate wired communication between the primary and secondary robots 12, 14 in addition to, or in lieu of, the wireless communication channels that may be provided by the first and second communication components 26, 28. The first and second electrical couplers 100, 102 may be configured to electrically couple to one another when the primary robot 12 is physically coupled to the secondary robot 14 via engagement of the first and second coupling systems 94, 96. To this end the first and second electrical couplers 100, 102 facilitate transmission of data signals and/or electrical power from the primary robot 12 to the secondary robot 14, and vice versa.

In the illustrated embodiment, the primary robot 12 includes a first power supply 106 (e.g., a first battery module) configured to provide electrical power to components of the primary robot 12. The secondary robot 14 includes a second power supply 108 (e.g., a second battery module) configured to provide electrical power to components of the secondary robot 14. In an engaged (e.g., coupled) configuration of the primary and secondary robots 12, 14 (e.g., in the assembled configuration of the multi-sectional show robot 16), the first and second electrical couplers 100, 102 enable flow of electrical current between the first and second power supplies 106, 108. The controllers 20, 24 may regulate power flow through the electrical couplers 100, 102 and between the first and second power supplies 106, 108, such that the first power supply 106 may be used to charge the second power supply 108, or vice versa. Respective charging modules 110 of the first and second processing systems 18, 22 may execute on the controllers 20. 24 to enable the controllers 20, 24 to monitor, regulate, and/or otherwise adjust electrical power flow between the first and second power supplies 106, 108. It should be appreciated that, in other embodiments, the primary and secondary robots 12, 14 may include wireless power transfer devices (e.g., inductive-based charging systems) that enable wireless electrical power transfer between the first power supply 106 and the second power supply 108, In some embodiments, the robotic system 10 includes a user interface 118 that may be communicatively coupled (e.g., via the network 29) to the primary robot 12, the secondary robot 14, and/or any other suitable components of the robotic system 10. The user interface 118 may receive user inputs to enable user-based control of the multi-sectional show robot 16 or subcomponents thereof.

FIG. 2 is flow diagram of an embodiment of a process 120 for operating the multi-sectional show robot 16. As noted above, portions of or all of the process 120 may be performed by one or more of the controllers 20, 24, and 30. The process 120 includes operating the primary robot 12 in accordance with a standard control scheme (e.g., a first control scheme), as indicated by block 122. At block 122, the secondary robot 14 may be physically decoupled from the primary robot 12. The first controller 20 may position the primary robot 12 at a base station (e.g., a charging station) or other suitable location in the amusement park. Alternatively, as discussed below, the first controller 20 may instruct the primary robot 12 to roam along a predefined or undefined path in the amusement park. When operating in accordance with the standard control scheme, the first controller 20 may operate the primary robot 12 to move (e.g., drive, step, otherwise travel) based on standard movement specifications (e.g., specifications defining a first drive speed, a first step speed, and/or a first step height of the primary motion platform 50).

As indicated by block 124, the first controller 20 may continuously or periodically evaluate whether the secondary robot 14 is coupled to the primary robot 12, such as via the engagement of the coupling systems 94, 96 and/or the electrical couplers 100, 102. If the first controller 20 detects that the secondary robot 14 is not coupled to the primary robot 12, the first controller 20 may continue to operate the primary robot 12 in accordance with the standard control scheme. If the first controller 20 detects that the secondary robot 14 is coupled to the primary robot 12, the first controller 20 may identify a type (e.g., a designated character type) of the secondary robot 14, as indicated by block 126. For example, the first controller 20 may receive a signal from the second controller 24 identifying the character type of the secondary robot 14, which may be specified in the character control library 72. As indicated by block 128, upon detecting the character type of the secondary robot 14, the first controller 20 selects a character-specific control scheme (e.g., which may be stored in the character control libraries 70 and/or 72; a second control scheme) under which the controller 20 is configured to operate the primary robot 12 and that corresponds to the detected character type of the secondary robot 14. As indicated by block 130, the first controller 20 may subsequently operate components of the primary robot 12, such as the primary motion platform 50, in accordance with the selected character-specific control scheme.

For example, when operating in accordance with the character-specific control scheme, the first controller 20 may control the primary robot 12 to move (e.g., drive, step, or otherwise travel) based on character-specific movement specifications that may be different from the standard movement specifications of the primary robot 12. That is, the character-specific movement specifications may define a second drive speed, a second step speed, a second step height, etc., of the primary motion platform 50, which may be different than the first drive speed, the first step speed, the first step height, etc., at which the primary motion platform 50 operates under the standard motion specifications. As such, primary robot 12 may adjust its overall motion profile based on the desired type of character the multi-sectional show robot 16 is to portray.

FIG. 3 is flow diagram of an embodiment of a process 140 for operating the multi-sectional show robot 16 in a roaming environment (e.g., a region of an amusement park). The process 140 includes executing a loading procedure to couple the secondary robot 14 to the primary robot 12, as indicated by block 142. For example, in some embodiments, a user (e.g., an operator of the robotic system 10) may manually couple the secondary robot 14 to the primary robot 12 (e.g., via the coupling systems 94, 96) to execute the loading procedure. In other embodiments, the primary robot 12 and/or the secondary robot 14, may include respective manipulators 144 (e.g., see FIG. 1) that enable automated coupling of the primary and secondary robots 12, 14.

In any case, upon receiving an indication that the secondary robot 14 is coupled to the primary robot 12, the first controller 20 may instruct the primary robot 12 to transfer the secondary robot 14 from a first initial location (e.g., a base station) to a first target location (e.g., a location in the amusement park), as indicated by block 146. The secondary robot 14 may be configured to detach from the primary robot 12 (e.g., via user-input, via actuation of the manipulators 144) at the first target location. As such, the secondary robot 14 may interact with park guests at or near the first target location or may roam (e.g., travel autonomously) along a predetermined or undefined path in the amusement park. Upon delivering the secondary robot 14 to the first target location, the primary robot 12 may return to the first initial location (e.g., the base station), as indicated by block 148. Alternatively, as discussed below, the primary robot 12 may continue to independently roam along a path to interact with additional guest of the amusement park.

In some embodiments, the primary robot 12 may be configured to monitor a health status of the secondary robot 14 while the secondary robot 14 is detached from the primary robot 12 and roaming along the amusement park, as indicated by block 150. For example, the first controller 20 may continuously or periodically monitor a power level of the second power supply 108 and evaluate whether the power level falls below a lower threshold value. Upon determining that the power level of the second power supply 108 falls below the lower threshold value (e.g., upon determining that the health status of the secondary robot 14 falls below a threshold value), the first controller 20 may execute a retrieval operation, as indicated by block 152, to locate the secondary robot 14 in the roaming environment and to return the secondary robot 14 to the base station (e.g., the first initial location). That is, the first controller 20 may instruct the primary robot 12 to travel to a current location of the secondary robot 14 (e.g., as indicated by the corresponding tracking sensor 86), re-couple to the secondary robot 14, and transfer the secondary robot 14 to a second target location (e.g., the base station). In some embodiments, the computing system 41 may transition the secondary robot 14 to a hibernating, inactive, or otherwise powered-down state while the secondary robot 14 is transferred to and from particular target locations by the primary robot 12. In other embodiments, the secondary robot 14 may remain operational during these periods, such that the multi-sectional show robot 16 may continue to interact with park guest during transit of the secondary robot 14 to and from various target locations of the amusement park.

As discussed below, it should be understood that the secondary robot 14 may be one of a plurality of secondary robots 14 that may be coupled to and transported by the primary robot 12 at a particular time. Indeed, the primary robot 12 may be configured to support (e.g., mechanically and/or communicatively couple to) 1, 2, 3, 4, 5, or more than 5 secondary robots 14. As such, the primary robot 12 may be configured to selectively deliver, transport, and retrieve each of the plurality of secondary robots 14. Therefore, it should be appreciated that, in such embodiments, the multi-sectional show robot 16 may include the primary robot 12 and any of the 1, 2, 3, 4, 5, or more than 5 secondary robots 14 configured to be supported by the primary robot 12.

Figure 4:
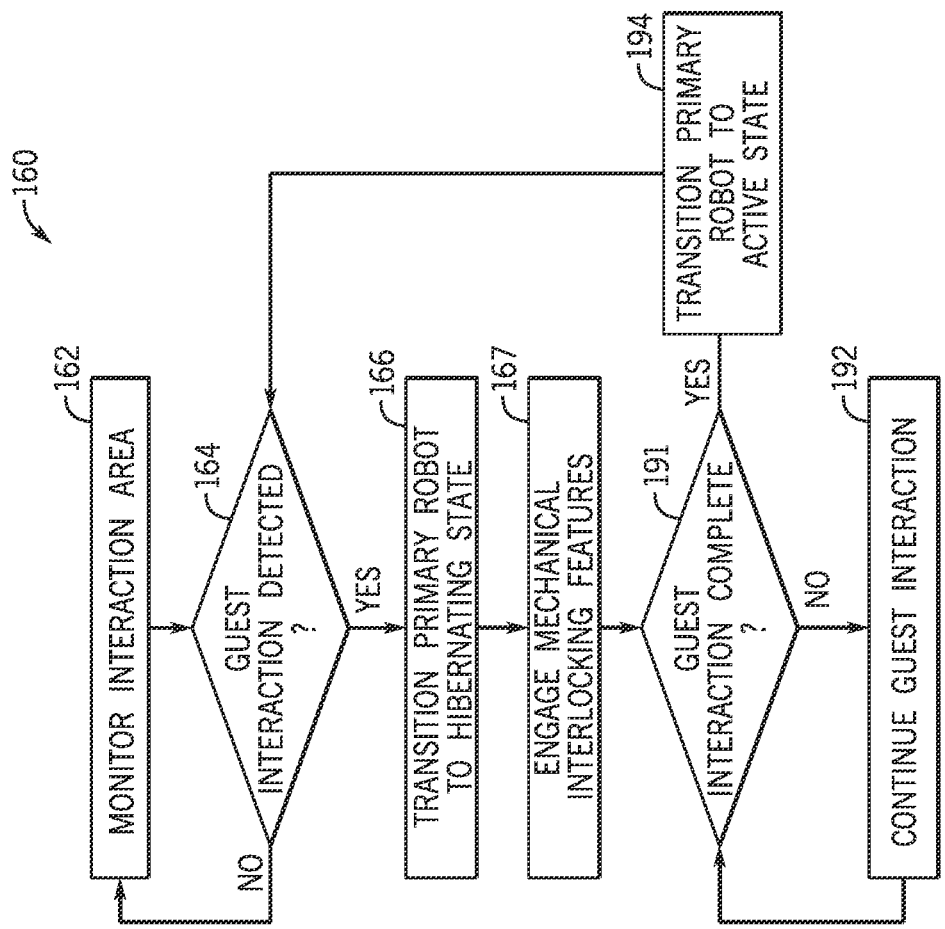
FIG. 4 is a flow diagram of an embodiment of a process for operating the multi-sectional show robot in an amusement park environment, in accordance with embodiments of the present disclosure.

FIG. 4 is flow diagram of an embodiment of a process 160 of operating the multi-sectional show robot 16, particularly when the multi-sectional show robot 16 is in the assembled configuration having the primary and secondary robots 12, 14 coupled to one another. In the illustrated embodiment, the process 160 includes monitoring an interaction area of the multi-sectional show robot 16, as indicated by block 162. The interaction area may include a threshold region of space extending about a perimeter of the multi-sectional show robot 16. For example, the multi-sectional show robot 16 may receive feedback from the first sensors 45, the second sensors 46, or both, indicative of objects or guests within and/or substantially adjacent to the interaction area.

The computing system 41 may determine, based on the acquired sensor feedback, whether a guest is within the interaction area and/or interacts with the multi-sectional show robot 16, as indicted by block 164. The computing system 41 may identify occurrence of a guest interaction with the multi-sectional show robot 16 when the guest steps within the interaction area of the multi-sectional show robot 16, reaches toward or grabs a component of the multi-sectional show robot 16, provides an audible command or visual gesture, or performs another suitable action. As indicated by block 166, upon determining occurrence of the guest interaction, the computing system 41 may transition the primary robot 12 to a hibernating state (e.g., a powered down or non-operational state), such that the primary motion platform 50 is temporarily deactivated. In the hibernating state, the computing system 41 may block or temporarily interrupt power flow (e.g., electrical current flow, hydraulic or pneumatic fluid flow) to various components or systems of the primary robot 12. That is, to transition the primary robot 12 to the hibernating state, the computing system 41 may deactivate one or more components of the primary robot 12 and/or suspend certain functionality of the primary robot 12 that would typically be operational/active when the primary robot 12 is not in the hibernating state. In certain embodiments, the computing system 41 may, when transitioning the primary robot 12 to the hibernating state, engage mechanical interlocking features that physically block movement of certain components or systems of the primary robot 12, as indicated by block 167. In this manner, the computing system 41 may reduce an electrical and/or mechanical potential energy of the primary robot 12 to ensure that the primary robot 12 is blocked from performing inadvertent movement (e.g., movement of legs or wheels of the primary robot 12) that may interfere (e.g., contact) the guest during the guest's interaction with the multi-sectional show robot 16.

Figure 5:
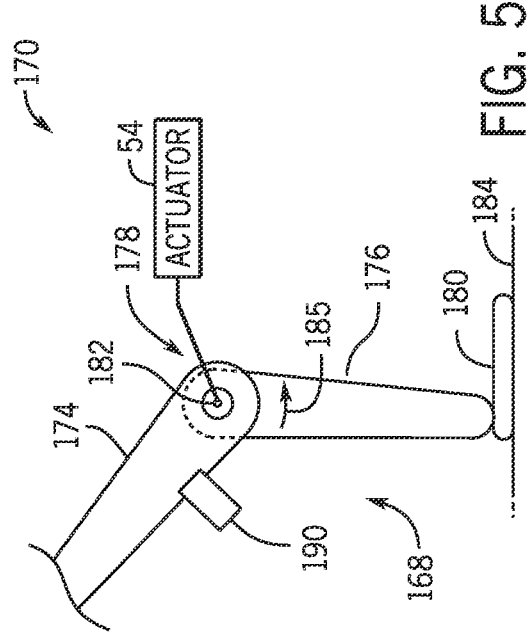
FIG. 5 is a schematic of an embodiment of an appendage of the multi-sectional show robot, where the appendage is in an operational position, in accordance with embodiments of the present disclosure.
Figure 6:
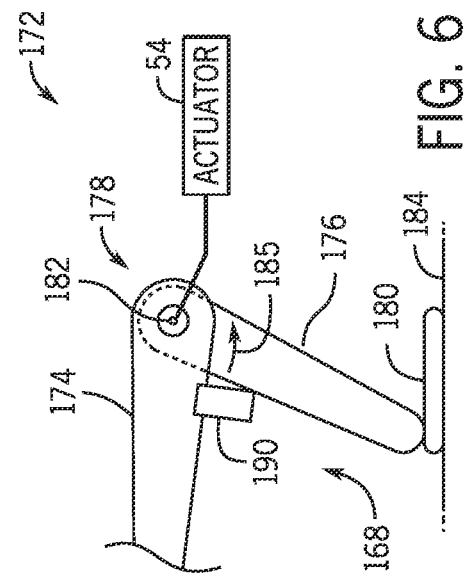
FIG. 6 is a schematic of an embodiment of the appendage of the multi-sectional show robot, where the appendage is in a resting position, in accordance with embodiments of the present disclosure.

For example, to better illustrate the engagement of the mechanical interlocking features and to facilitate the following discussion, FIG. 5 is a schematic of an embodiment of a leg 168 (e.g., an appendage) of the primary robot 12, where the leg 168 is in an operational position 170. The leg 168 may be included in the primary motion platform 50 of primary robot 12. FIG. 6 is a schematic of an embodiment of the leg 168 in a resting position 172. FIGS. 5 and 6 will be discussed concurrently below.

The leg 168 includes a first member 174 and a second member 176 coupled at a joint 178 and a foot 180 coupled to the second member 176. The actuator 54 of the primary motion platform 50 is configured to pivot the first member 174 and/or the second member 176 about an axis 182 of the joint 178 and, thus, enables the leg 168 to facilitate movement of the primary robot 12 across a surface 184. When transitioning the primary robot 12 to the hibernating state, the computing system 41 may instruct the actuator 54 to transition the leg 168 the resting position 172, thereby enabling an interlocking feature 190 of the first member 174 to contact the second member 176 to block further rotational movement of the first member 174 about the axis 182 (e.g., relative to the second member 176, in a counterclockwise direction 185). Accordingly, the interlocking feature 190 may inhibit undesired movement of the leg 168 when power (e.g., electrical power, hydraulic power, pneumatic power) to the actuator 54 is suspended, such as when the primary robot 12 is transitioned to the hibernating state. It should be appreciated that various interlocking features 190 may be implemented on variety of other components of the multi-sectional show robot 16 to block certain ranges of movement of these components when a power supply to the components is suspended or otherwise interrupted. In some embodiments, the interlocking features 190 (which may be part of the primary robot 12 or the secondary robot 14) may be operable to actuate (e.g., extend, flex, pivot) to actively create a supporting engagement between robotic components (e.g., the first member 174) and then lock into place to block further movement of one or more of the robotic components.

The following discussion continues with reference to FIG. 4. Upon transitioning the primary robot 12 to the hibernating state, the computing system 41 determines whether the interaction between the multi-sectional show robot 16 and the one or more guests is complete, as indicated by block 191. If the computing system 41 determines (e.g., based on feedback acquired by the sensors 45 and/or 46) that the guest interaction is not complete, the computing system 41 instructs the secondary robot 14 to continue to interact with the guest, as indicated by block 192. If the computing system 41 determines that the guest interaction is complete, the computing system 41 may transition the primary robot 12 to an active state, as indicate by block 194, such that the primary robot 12 may again propel the multi-sectional show robot 16 along a path.

Figures 7, 8:
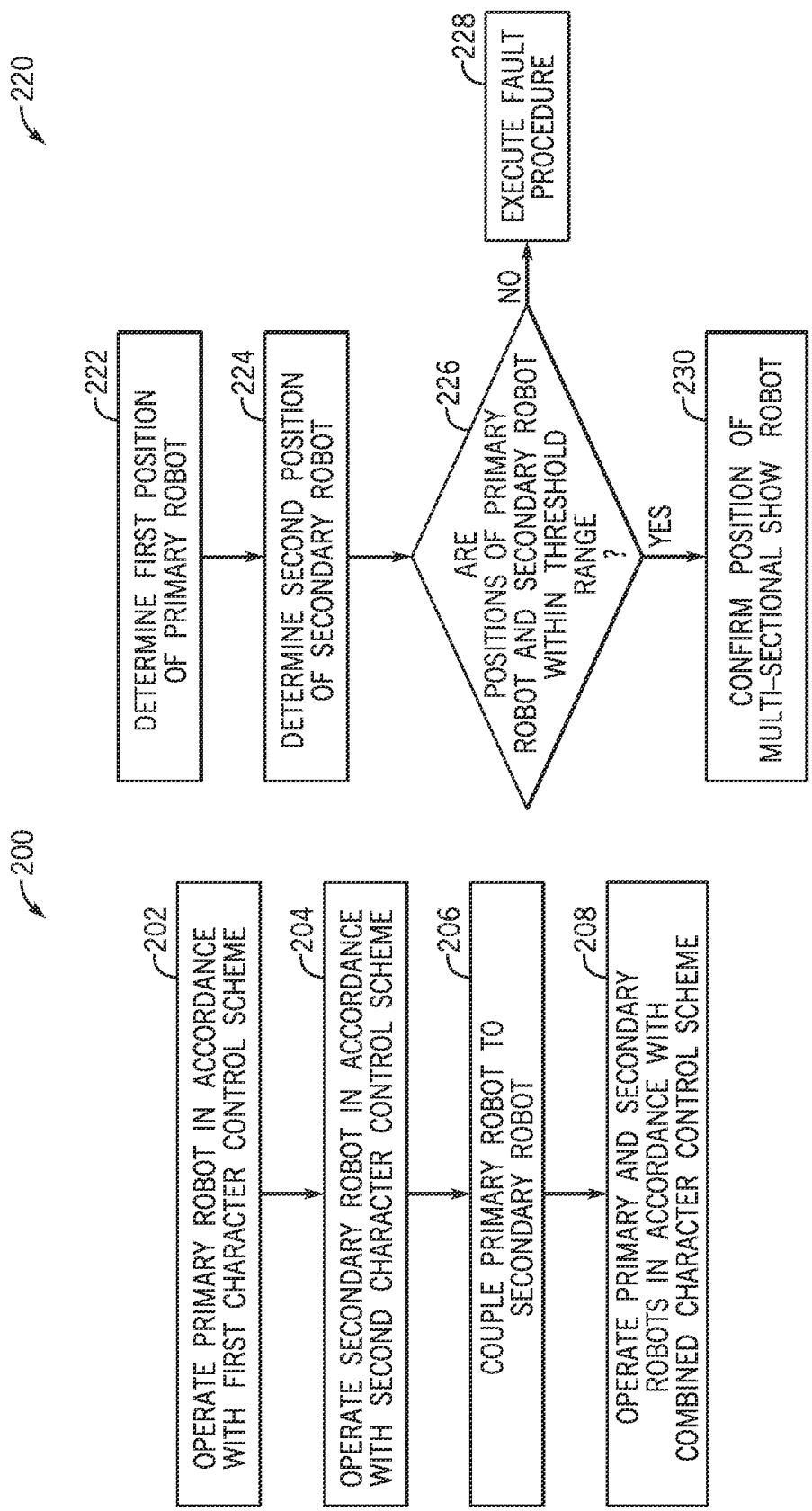
FIG. 7 is a flow diagram of an embodiment of a process for operating the primary robot and the secondary robot in accordance with respective character control schemes, in accordance with embodiments of the present disclosure.
FIG. 8 is a flow diagram of an embodiment of a process for verifying a position of the multi-sectional show robot in an environment, in accordance with embodiments of the present disclosure.

As briefly discussed above, in some embodiments, the multi-sectional show robot 16 may operate in a split configuration, in which the primary and secondary robots 12, 14 may each independently roam (e.g., walk, drive, swim, fly, or otherwise move) along an environment and interact with guests in the environment. FIG. 7 is a flow diagram of an embodiment of a process 200 for operating the multi-sectional show robot 16 in the split configuration. The process 200 includes operating the primary robot 12 in accordance with a first character control scheme (e.g., a first set of control routines, a first control scheme), as indicated by block 202, and operating the secondary robot 14 in accordance with a second character control scheme (e.g., a second set of control routines, a second control scheme), as indicated by block 204. At blocks 202 and 204, the primary and secondary robots 12, 14 may be physically decoupled from one another, such that the multi-sectional show robot 16 is in the split configuration.

For example, in some embodiments, the primary robot 12 may be dressed, decorated, or otherwise customized to illustrate a first character (e.g., a dog) while the secondary robot 14 is dressed, decorated, or otherwise customized to appear as a second character (e.g., an owl). When the primary robot 12 is decoupled from (e.g., not physically attached or tethered to) the secondary robot 14, the primary robot 12 may execute the first character control scheme to interact with guests in accordance with a first set of pre-programmed mannerisms. That is, upon detection of a guest within an interaction area of the primary robot 12 (e.g., via feedback from the first sensors 45), the first controller 20 may instruct the first interaction system 58 to output a first set of audio, visual, and/or gesture outputs corresponding to the first character control scheme. Similarly, upon detection of a guest within an interaction area of the secondary robot 14 (e.g., via feedback from the second sensors 46), the second controller 24 may instruct the second interaction system 60 to output a second set of audio, visual, and/or gesture outputs corresponding to the second character control scheme. Thus, the primary robot 12 and the secondary robot 14 may provide guests with unique interactive experiences that correspond to the individual characters (e.g., dog, owl) to be portrayed by the primary and secondary robots 12, 14.

In the illustrated embodiment, the process 200 includes coupling (e.g., physically coupling, physically tethering) the primary and secondary robots 12, 14 to one another, as indicated by block 206. Indeed, as set forth above, the primary robot 12 may be configured to locate and retrieve the secondary robot 14 during particular time periods, such as when a power level within the second power supply 108 of the secondary robot 14 falls below a threshold level. Upon detecting that the primary and secondary robots 12, 14 are in an engaged configuration (e.g., physically coupled), the computing system 41 may operate the primary and secondary robots 12, 14 in accordance with a combined character control scheme (e.g., a third control scheme), as indicated by block 208, which may be different than the first and second character control schemes discussed above. Particularly, when operating in accordance with the combined character control scheme, the primary and secondary robots 12, 14 may be configured to cooperatively provide an interactive experience for one or more guests. For example, when operating in accordance with the combined character control scheme, guest inputs (e.g., verbal commands, physical inputs) received by the primary robot 12 and/or outputs (e.g., audio, visual, gesture) generated by the primary robot 12 may affect a show or performance provided by the secondary robot 14, and vice versa. To this end, the multi-sectional show robot 16 may provide a plurality of different show performances that are adjusted based on a current configuration (e.g., attached, detached) of the primary and secondary robots 12, 14.

FIG. 8 is flow diagram of an embodiment of a process 220 for verifying a position of the multi-sectional show robot 16, particularly when the primary robot 12 and the secondary robot 14 are in an engaged configuration (e.g., physically coupled to one another). The process 220 includes determining a first position of the primary robot 12, as indicated by block 222, and determining a second position of the secondary robot 14, as indicated by block 224. For example, in some embodiments, the computing system 41 may receive signals from the tracking sensor 86 of the primary robot 12 and the tracking sensor 86 of the secondary robot 14 that convey the first position of the primary robot 12 and the second position of the secondary robot 14 relative to a reference frame. The computing system 41 may determine, as indicated by block 226, whether the first position of the primary robot 12 is within a threshold range of the second position of the secondary robot 14. As indicated by block 228, if the first position is not within the threshold range of the second position, the computing system 41 may execute a fault procedure by, for example, deactivating the multi-sectional show robot 16 and/or sending an alert to the user interface 118. For example, in accordance with the techniques discussed above, the primary robot 12, the secondary robot 14, or both, may transition to a respective hibernating or powered down state upon detection of the fault condition. In some embodiments, the interlocking features 190 may be used to retain the primary and/or secondary robots 12, 14 in particular resting positions while the primary and/or secondary robots 12, 14 are in the respective hibernating states.

If the first position is within the threshold range of the second position, the computing system 41 may log (e.g., in the memory devices 40, 42, and/or 44) the current position of the multi-sectional show robot 16, as indicated by block 230, and return to the block 222.

Figure 9:
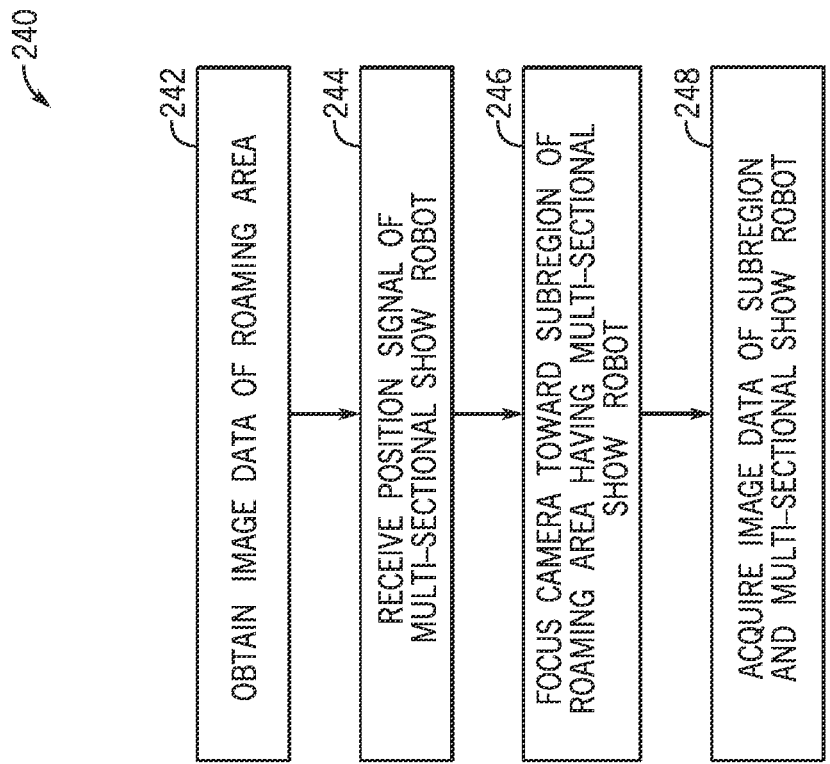
FIG. 9 is a flow diagram of an embodiment of a process for monitoring the position of the multi-sectional show robot in the environment using a machine vision system, in accordance with embodiments of the present disclosure.

FIG. 9 is flow diagram of an embodiment of a process 240 for monitoring a position of the multi-sectional show robot 16 using the machine vision system 88 (see FIG. 1), particularly when the multi-sectional show robot 16 is in the assembled configuration in which the primary and secondary robots 12, 14 are coupled to one another. It should be understood that the machine vision system 88 may be separate (e.g., physically decoupled) from the multi-sectional show robot 16. As an example, the machine vision system 88 may be coupled to an unmanned aerial vehicle (e.g., a drone) configured to fly above a roaming area of the multi-sectional show robot 16. In the illustrated embodiment, the process 240 includes obtaining image data of a roaming area of the multi-sectional show robot 16, as indicated by block 242. For example, in some embodiments, the computing system 41 may be configured to receive a substantially real-time video feed of the roaming area and of the multi-sectional show robot 16 via the one or more cameras 90 of the machine vision system 88. As indicated by block 244, the computing system 41 may be configured to receive a position signal from the tracking sensors 86 of the primary robot 12 and/or of the secondary robot 14 indicating a current location of the multi-sectional show robot 16 in the roaming environment. As indicated by block 246, the computing system 41 may, based on analysis of the position signal, instruct the machine vision system 88 to acquire additional image data of a subregion of the roaming area identified as having the multi-sectional show robot 16. For example, the machine vision system 88 may adjust a magnification or zoom or the cameras 90, a position and/or orientation of the cameras 90 (e.g., via corresponding actuators), and/or other operational parameters of the cameras 90 to image the subregion at a finer granularity, as compared to a granularity at which the subregion may be imaged at the block 242. In this manner, the machine vision system 88 may continuously or intermittently (e.g., after lapse of a threshold time interval) acquire image data of the multi-sectional show robot 16 and of the subregion of the roaming area having the multi-sectional show robot 16, as indicated by block 248. It should be understood that the process 240 may also be used to independently acquire image data of the primary robot 12 and a subregion occupied by the primary robot 12, and of the secondary robot 14 and a second subregion occupied by the secondary robot 14, such as when the primary and secondary robots 12, 14 independently travel across the roaming area.

FIG. 10 is a schematic of an embodiment of a portion of the robotic system 10. In some embodiments, the primary robot 12 may include a ride vehicle 260 configured to transport one or more passengers along a guided or unguided path 262 of an attraction 264. The ride vehicle 260 may include the first coupling system 94 and/or the first electrical coupler 100 configured to couple with the second coupling system 96 and/or the second electrical coupler 102 of the secondary robot 14. The secondary robot 14 may be selectively coupled to the ride vehicle 260 to provide guests with a show or performance as the ride vehicle 260 travels along the path 262. The secondary robot 14 may be replaced with other secondary robots (e.g., secondary robots configured to portray other characters or themes) in accordance with the techniques discussed above and, thus, enable customization of a show performance provided by the attraction 264 (e.g., such as between ride cycles of the attraction 264.)

FIG. 11 is a schematic of an embodiment of the multi-sectional show robot 16. In some embodiments, the primary robot 12 and the secondary robot 14 may be mechanically and/or communicatively coupled to one another via a tethering device 280 (e.g., one or more tethers, a chain of tethers). The tethering device 280 may include a rope, cable, chain, or other suitable tether. In some embodiments, electrical cables and/or optical cables (e.g., fiber optics) may be integrated with the tethering device 280 to facilitate data transmission between the primary and secondary robots 12, 14. In certain embodiments, the primary robot 12 may be configured to propel (e.g., pull or push) the secondary robot 14 along an environment, such that the secondary motion platform 52 may be omitted from the secondary robot 14 and replaced with passive wheels, skids, or other devices. In embodiments where the secondary robot 14 includes the secondary motion platform 52, the secondary motion platform 52 may be operable (e.g., via signals sent by the second controller 24) to guide the secondary robot 14 along a path that constructively or destructively interferes with a path of the primary robot 12. In some embodiments, the secondary robot 14 may include an unmanned aerial vehicle (UAV) 284 or other suitable drone. The UAV 284 may be coupled to the primary robot 12 via the tethering device 280 or may be physically detached from the primary robot 12, such that the tethering device 280 may be omitted. Moreover, it should be understood that the multi-sectional show robot 16 may include a plurality of tethering devices 280 configured to physically and/or communicatively couple a plurality of secondary robots 14 to the primary robot 12

In some embodiments, the tethering device 280 may be omitted from the multi-sectional show robot 16, and the secondary motion platform 52 may be configured to direct the secondary robot 14 along a path that follows or precedes a moving path of the primary robot 12. As an example, the secondary motion platform 52 may, based on signals received from the computing system 41, propel the secondary robot 14 to remain within a threshold distance of the primary robot 12 as the primary robot 12 traverses a particular path.

In some embodiments, the primary robot 12, the secondary robot 14, or both, may include one or more collision mitigation features 288, such as airbags, dampers, stabilizing legs, or other suitable devices or systems that are configured to mitigate, dampen, or otherwise reduce an impact force that may occur as a result of an inadvertent collision between primary and secondary robots 12, 14 and an object 290. The computing system 41 may be configured to detect an imminent impact between the primary or secondary robots 12, 14 (e.g., based on feedback acquired by the first and/or second sensors 45, 46) and the object 290 and to deploy some of or all of the collision mitigation features 288 substantially before or during occurrence of the impact. As such, the collision mitigation features 288 may reduce wear or performance degradation that may occur as a result of a collision between the multi-section show robot 16 and the object 290.

Figure 12:
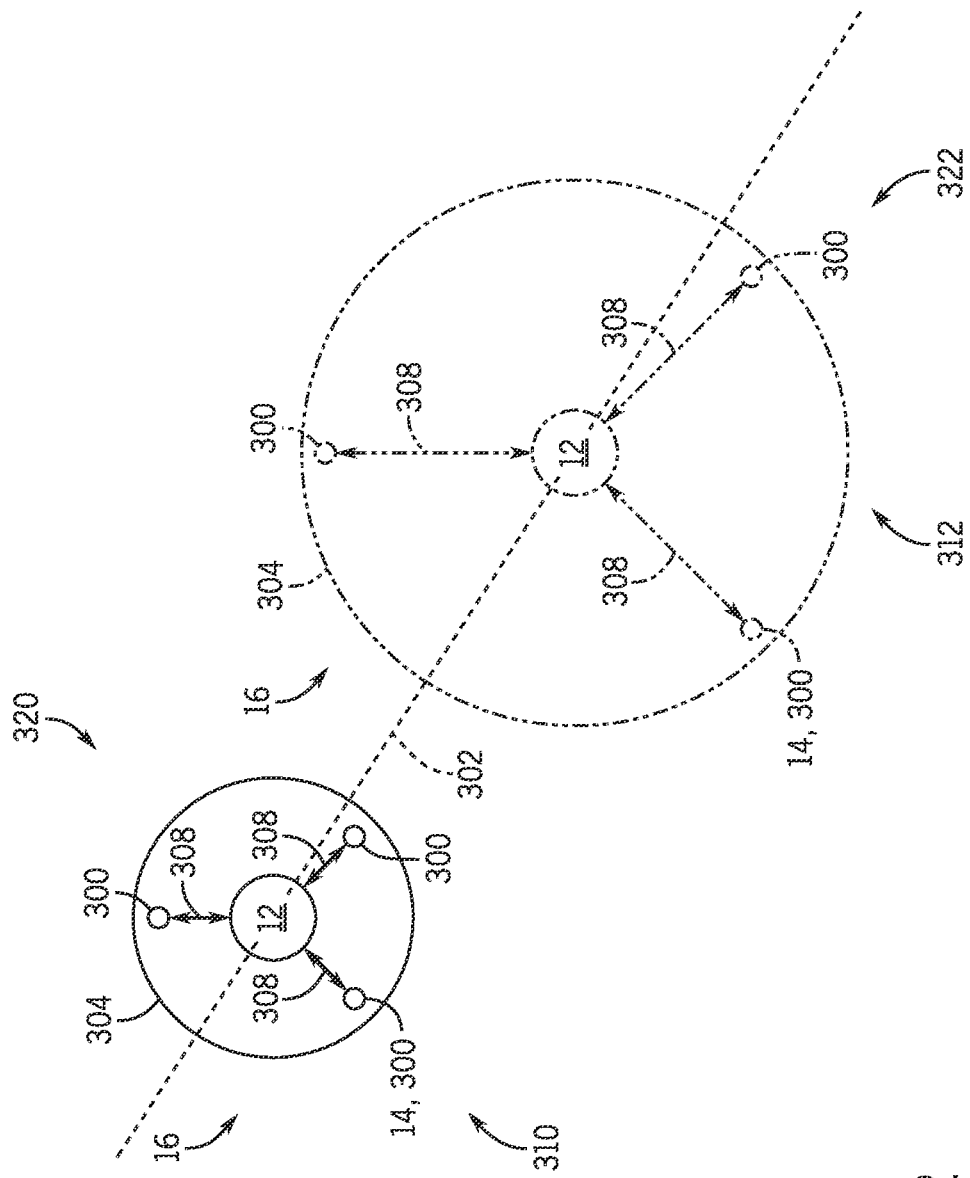
FIG. 12 is a schematic of an embodiment of the multi-sectional show robot that includes a plurality of secondary robots, in accordance with embodiments of the present disclosure.

FIG. 12 is a schematic of an embodiment of the multi-sectional show robot 16. As discussed above, the secondary robot 14 may be one of a plurality of secondary robots 300 included in the multi-sectional show robot 16. The secondary robots 300 may be positioned about the primary robot 12 and configured to maintain a particular orientation and/or position relative to the primary robot 12 as the primary robot 12 travels along a path 302. A covering material 304 (e.g., rubber, another suitable elastic material) may be coupled to and disposed over the primary robot 12 and the secondary robots 300 and may thereby provide an illusion that the multi-sectional show robot 16 is a cohesive structure having a single body. The covering material 304 may be themed or otherwise customized to augment an overall character (e.g., dragon, wolf, or other creature) to be portrayed by the multi-sectional show robot 16.

In some embodiments, the computing system 41 may selectively instruct one or more of the secondary robots 300 to adjust their relative positions to the primary robot 12 while the primary robot 12 is stationary or travels along the path 302. As a non-limiting example, the computing system 41 may instruct the secondary robots 300 to increase or decrease respective radial dimensions 308 between the secondary robots 300 and the primary robot 12 as the primary robot 12 travels from an initial location 310 to a target location 312 on the path 302. Accordingly, the secondary robots 300 may stretch the covering material 304 (e.g., in directions radially outward relative to the primary robot 12) or allow the covering material 304 to retract (e.g., in directions radially inward relative to the primary robot 12) to enable an overall viewable body of the multi-sectional show robot 16 (e.g., defined at least partially by the covering material 304) to expand, contract or otherwise shift in shape. As an example, in this manner, cooperation between the primary robot 12 and the secondary robots 300 may permit the multi-sectional show robot 16 to transition between a resting state 320 and an expanded state 322 and, therefore, provide an illusion that a body the multi-sectional show robot 16 expands or contracts.

As set forth above, embodiments of the present disclosure may provide one or more technical effects useful for providing a plurality of uniquely themed robotic experiences to guests of an amusement park environment via a robotic system having a multi-sectional show robot. The multi-sectional show robot includes a primary robotic platform and one or more selectively engageable secondary robotic platforms that enable the multi-section robot to enact various themed characters and/or perform a variety of shows or performances. As such, the multi-sectional show robot may reduce an overall manufacturing complexity and/or maintenance cost of the robotic system, as compared to traditional robotic systems that may include a dedicated show robot corresponding to a particular, individual character. It should be understood that the technical effects and technical problems in the specification are examples and are not limiting. Indeed, it should be noted that the embodiments described in the specification may have other technical effects and can solve other technical problems.

While only certain features of the disclosure have been illustrated and described herein, many modifications and changes will occur to those skilled in the art. It is, therefore, to be understood that the appended claims are intended to cover all such modifications and changes as fall within the true spirit of the disclosure. It should be appreciated that any of the features illustrated or described with respect to the figures discussed above may be combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A robotic system comprising a multi-sectional show robot, wherein the multi-sectional show robot comprises:
    at least one controller;
    a primary robot comprising one or more sensors configured to acquire feedback indicative of an environment surrounding the primary robot, wherein the primary robot comprises a first appearance corresponding to a first character of a theme; and
    a plurality of secondary robots comprising a first secondary robot having a second appearance corresponding to a second character of the theme, the second appearance differing from the first appearance, and the plurality of secondary robots comprising a second secondary robot, wherein the first secondary robot and the second secondary robot are configured to removably couple to the primary robot to transition the multi-sectional show robot between a disengaged configuration, in which the primary robot is decoupled from the first secondary robot and the second secondary robot, and an a first engaged configuration, in which the primary robot is coupled to the first secondary robot, and a second engaged configuration, in which the primary robot is coupled to the second secondary robot, wherein the at least one controller is configured to instruct at least the primary robot based on the feedback and one or more first character control schemes with the multi-sectional show robot in the disengaged configuration, and wherein the at least one controller is configured to instruct the primary robot and the first secondary robot based on one or more second character control schemes with the multi-sectional show robot in the first engaged configuration.

2. The robotic system of claim 1, wherein the first secondary robot comprises one or more additional sensors, wherein the at least one controller comprises a controller corresponding to the primary robot and an additional controller corresponding to the first secondary robot, and wherein the one or more additional sensors are configured to acquire additional feedback indicative of an environment surrounding the first secondary robot.

3. The robotic system of claim 2, wherein the additional controller is configured to: instruct the first secondary robot based on at least the additional feedback and a first determination that the multi-sectional show robot is in the disengaged configuration; and
    instruct the first secondary robot based on the second control scheme and at least the additional feedback and a second determination that the multi-sectional show robot is in the first engaged configuration.

4. The robotic system of claim 1, wherein at least the primary robot, the first secondary robot, or the second secondary robot comprises an interaction system having at least an audio output device, a visual output device, or a gesture output device.

5. The robotic system of claim 1, wherein the one or more first character control schemes and the one or more second character control schemes define movement specifications of a propulsion system of at least the primary robot.

6. The robotic system of claim 1, comprising a system controller and a machine vision system communicatively coupled to the system controller, wherein the machine vision system is configured to acquire image data of at least the primary robot, the first secondary robot, or the second secondary robot, and wherein the system controller is configured to monitor a relative position of at least the primary robot, the first secondary robot, or the second secondary robot based on the image data.

7. The robotic system of claim 1, wherein the primary robot comprises a ride vehicle of an attraction.

8. The robotic system of claim 1, wherein, in the first engaged configuration or the second engaged configuration of the multi-sectional show robot, the primary robot and at least the first secondary robot or the second secondary robot are coupled via a tether.

9. The robotic system of claim 1, wherein the first character differs from the second character.

10. The robotic system of claim 1, wherein the first character is the same as the second character.

11. A method for operating a multi-sectional show robot, comprising:
generating feedback indicative of an environment surrounding a primary robot of the multi-sectional show robot via one or more sensors of the primary robot, wherein the primary robot comprises a first appearance corresponding to a first character of a theme;
instructing, via one or more controllers, at least the primary robot or a first secondary robot to cause one or more first movements of at least the primary robot or the first secondary robot, wherein the first secondary robot comprises a second appearance corresponding to a second character of the theme, the second appearance differing from the first appearance, and wherein the one or more first movements are based on one or more character control schemes and the feedback, and the feedback indicating a first spatial relationship between the primary robot and the first secondary robot; and
instructing, via the one or more controllers, at least the primary robot or a second secondary robot to cause one or more second movements of at least the primary robot or the second secondary robot, wherein the one or more second movements are based on the one or more character control schemes and the feedback, the feedback indicating a second spatial relationship between the primary robot and the second secondary robot, and wherein the one or more second movements are different than the one or more first movements.

12. The method of claim 11, comprising:
executing a loading procedure to couple the first secondary robot to the primary robot;
transporting the first secondary robot from an initial location to a target location via the primary robot; and
decoupling the first secondary robot from the primary robot at the target location to deposit the first secondary robot at the target location.

13. The method of claim 11, comprising:
determining, based on the feedback, that the first spatial relationship corresponds to a first engaged configuration in which the first secondary robot is coupled to the primary robot; and
determining, based on the feedback, that the second spatial relationship corresponds to a second engaged configuration in which the second secondary robot is coupled to the primary robot.

14. The method of claim 11, wherein the one or more first movements comprise at least the primary robot or first secondary robot moving along a first path based on the one or more character control schemes, and wherein the one or more second movements comprise at least the primary robot or second secondary robot moving along a second path based on the one or more character control schemes, the second path differing from the first path.

15. The method of claim 11, comprising:
generating first additional feedback indicative of a first additional environment surrounding the first secondary robot of the multi-sectional show robot via one or more first additional sensors of the first secondary robot;
generating second additional feedback indicative of a second additional environment surrounding the second secondary robot of the multi-sectional show robot via one or more second additional sensors of the second secondary robot;
monitoring, based on at least the feedback, the first additional feedback, or the second additional feedback, an interaction area surrounding the multi-sectional show robot to identify an occurrence of a guest interaction by a guest with the multi-sectional show robot;
instructing, via the one or more controllers and in response to the occurrence of the guest interaction, at least the primary robot or the first secondary robot to cause one or more first audio outputs directed at the guest; and
instructing, via the one or more controllers and in response to the occurrence of the guest interaction, at least the primary robot or the second secondary robot to cause one or more second audio outputs directed at the guest, the one or more second audio outputs differing from the one or more first audio outputs.

16. The method of claim 11, wherein:
the one or more first movements comprise the primary robot moving at a first movement speed and a first movement style and the first secondary robot moving at a second movement speed and a second movement style based on the one or more character control scheme, the first movement speed differing from the second movement speed and the first movement style differing from the second movement style; and
the one or more second movements comprise the primary robot moving at a third movement speed and a third movement style and the second secondary robot moving at a fourth movement speed and a fourth movement style based on the one or more character control schemes, the third movement speed differing from the fourth movement speed and the third movement style differing from the fourth movement style.

17. The method of claim 11, comprising:
generating first additional feedback indicative of a first additional environment surrounding the first secondary robot of the multi-sectional show robot via one or more first additional sensors of the first secondary robot;
generating second additional feedback indicative of a second additional environment surrounding the second secondary robot of the multi-sectional show robot via one or more second additional sensors of the second secondary robot;
monitoring, based on at least the feedback, the first additional feedback, or the second additional feedback, an interaction area surrounding the multi-sectional show robot to identify an occurrence of a guest interaction by a guest with the multi-sectional show robot;
instructing, via the one or more controllers and in response to the occurrence of the guest interaction, at least the primary robot or the first secondary robot to cause one or more first gesture outputs directed at the guest; and
instructing, via the one or more controllers and in response to the occurrence of the guest interaction, at least the primary robot or the second secondary robot to cause one or more second gesture outputs directed at the guest, the one or more first gesture outputs differing from the one or more second gesture outputs.

18. The method of claim 11, comprising:
generating first additional feedback indicative of a first additional environment surrounding the first secondary robot of the multi-sectional show robot via one or more first additional sensors of the first secondary robot;
generating second additional feedback indicative of a second additional environment surrounding the second secondary robot of the multi-sectional show robot via one or more second additional sensors of the second secondary robot;
monitoring, based on at least the feedback, the first additional feedback, or the second additional feedback, an interaction area surrounding the multi-sectional show robot to identify an occurrence of a guest interaction by a guest with the multi-sectional show robot;
instructing, via the one or more controllers and in response to the occurrence of the guest interaction, at least the primary robot or the first secondary robot to cause one or more first visual outputs directed at the guest via one or more displays of the multi-sectional show robot; and
instructing, via the one or more controllers and in response to the occurrence of the guest interaction, at least the primary robot or the second secondary robot to cause one or more second visual outputs directed at the guest, the one or more second visual outputs differing from the one or more first visual outputs.

19. A multi-sectional show robot, comprising:
a primary robot comprising one or more sensors configured to acquire feedback indicative of a first environment surrounding the primary robot, wherein the primary robot comprises a first appearance corresponding to a first character of a theme;
a secondary robot comprising one or more additional sensors configured to acquire additional feedback indicative of a second environment surrounding the secondary robot, wherein the secondary robot comprises a second appearance corresponding to a second character of the theme, wherein the first appearance differs from the second appearance; and
a computing system comprising at least a first controller of the primary robot or a second controller of the secondary robot, wherein the computing system is configured to:
receive an indication that the primary robot is coupled to the secondary robot; and
in response to receiving the indication, instruct the primary robot and the secondary robot to cause an operation of the primary robot and the secondary robot based on one or more character control schemes and at least the feedback or the additional feedback.

20. The multi-sectional show robot of claim 19, wherein the computing system is configured to:
monitor, based on at least the feedback or the additional feedback, an interaction area surrounding the multi-sectional show robot to identify an occurrence of a guest interaction by a guest with the multi-sectional show robot; and
in response to determining the occurrence of the guest interaction, instruct at least the primary robot or the secondary robot to cause a movement of at least the primary robot or the secondary robot, the movement corresponding to a gesture directed at the guest.

21. The multi-sectional show robot of claim 19, comprising:
an additional secondary robot comprising a third appearance corresponding to a third character of the theme, wherein the third appearance differs from the first appearance and the second appearance, and the computing system is configured to:
receive an additional indication that the primary robot is coupled to the additional secondary robot; and
in response to receiving the additional indication, instruct the primary robot and the additional secondary robot to cause an additional operation of the primary robot and the additional secondary robot based on at least the one or more character control schemes.

22. The multi-sectional show robot of claim 19, wherein the computing system is configured to:
detect, based on at least the feedback or the additional feedback, a collision between the primary robot and the secondary robot or an additional collision between the primary robot and an object separate from the secondary robot; and
instruct the primary robot to cause a movement of the primary robot in response to detecting the collision or the additional collision.

23. The multi-sectional show robot of claim 19, wherein the computing system is configured to:
select the one or more character control schemes from a plurality of character control schemes stored in a character control library in response to receiving the indication, wherein the one or more character control schemes comprises at least a set of audio recordings, visual displays, or gesture movements;
receive an additional indication that the primary robot is decoupled from the secondary robot; and
select an additional one or more character control schemes from the plurality of character control schemes stored in the character control library in response to receiving the additional indication, wherein the additional one or more character control schemes comprises at least an additional set of audio recordings, visual displays, or gesture movements, and the one or more character control schemes differ from the additional one or more character control schemes.

24. The multi-sectional show robot of claim 19, wherein the first character differs from the second character.

* * * * *